Figure 3:
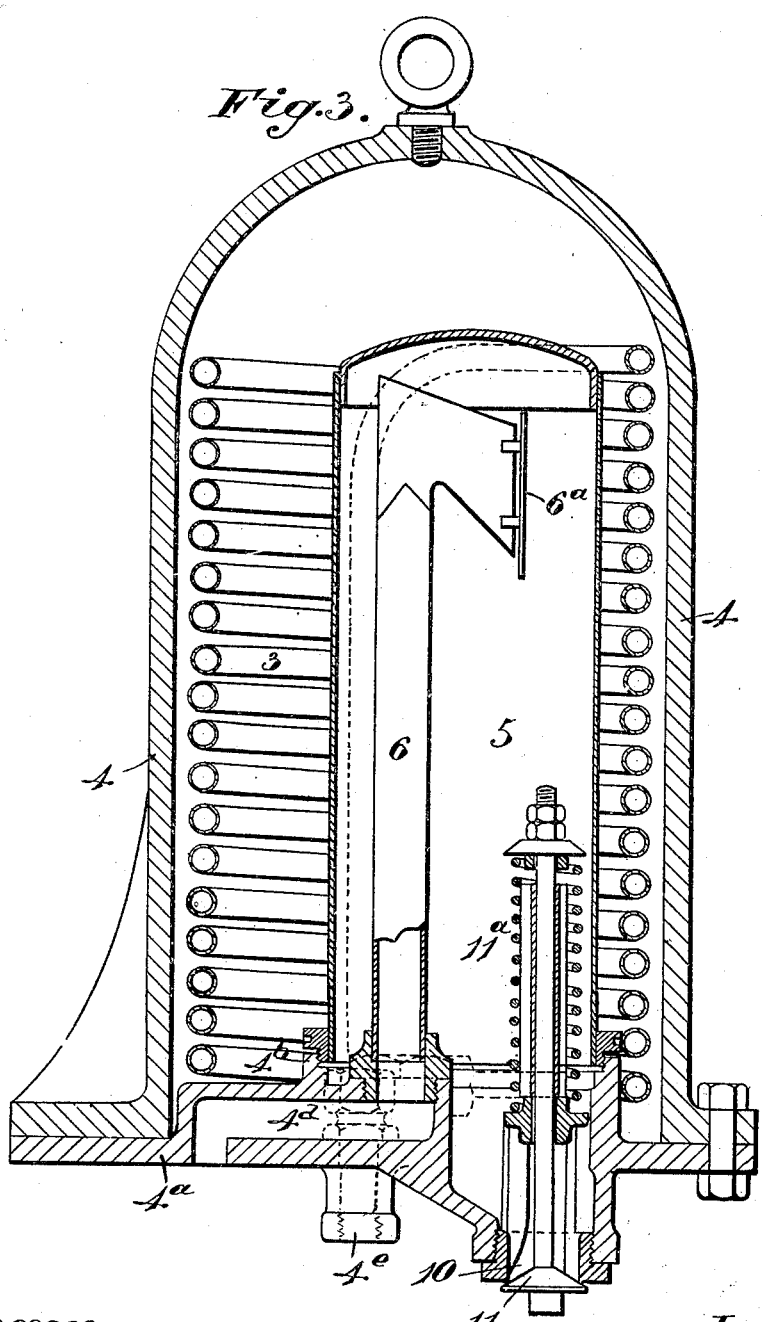

No. 688,205. Patented Dec. 3, 1901.
E. SHAW.
APPARATUS FOR PREPARING SYRUP FOR CONFECTIONERY.
(Application filed Oct. 10, 1898.)
(No Model.) 6 Sheets—Sheet 1.
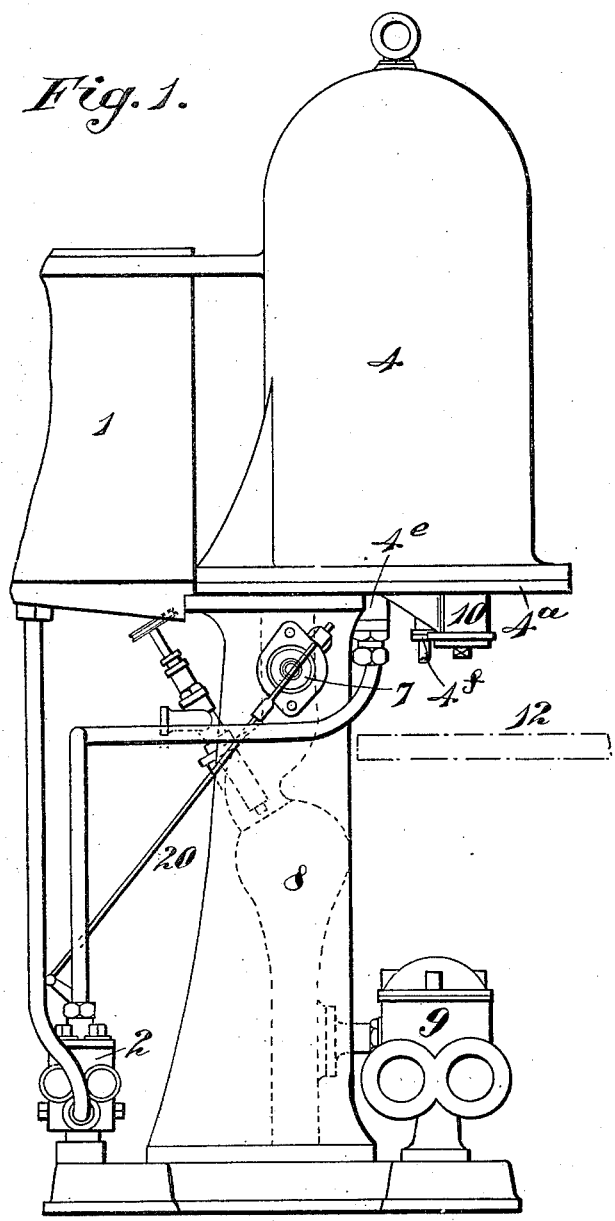
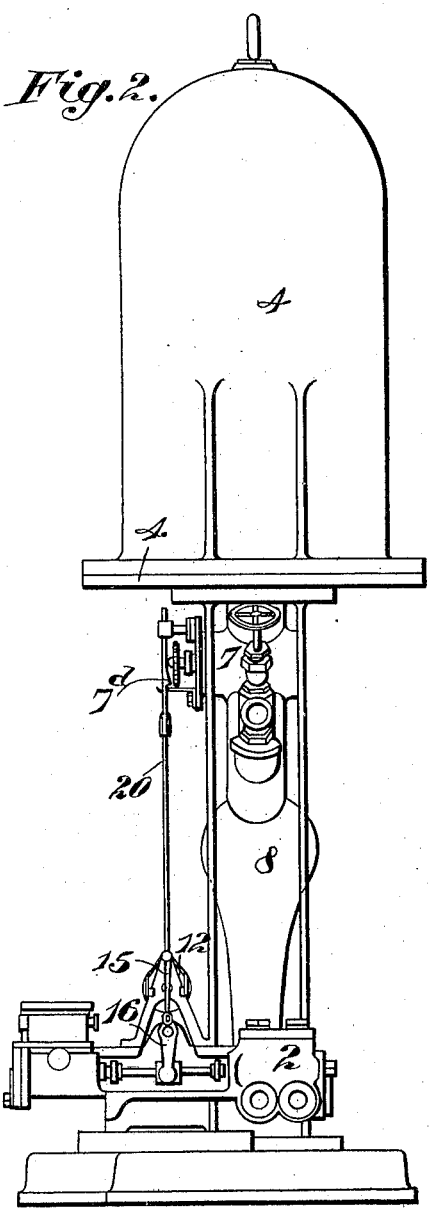
Witnesses.
Geo. E. Fresh
B. E. Seitz
Inventor
Edward Shaw
by A. S. Pattison
atty.

No. 688,205. Patented Dec. 3, 1901.
E. SHAW.
APPARATUS FOR PREPARING SYRUP FOR CONFECTIONERY.
(Application filed Oct. 10, 1898.)
(No Model.) 6 Sheets—Sheet 2.

Witnesses
Geo. E. Finch
B. E. Seitz

Inventor
Edward Shaw
by A. S. Pattison
atty

No. 688,205. Patented Dec. 3, 1901.
E. SHAW.
APPARATUS FOR PREPARING SYRUP FOR CONFECTIONERY.
(Application filed Oct. 10, 1898.)
(No Model.) 6 Sheets—Sheet 3.

Witnesses
Inventor
Edward Shaw
atty

No. 688,205. Patented Dec. 3, 1901.
E. SHAW.
APPARATUS FOR PREPARING SYRUP FOR CONFECTIONERY.
(Application filed Oct. 10, 1898.)
(No Model.) 6 Sheets—Sheet 4.

Witnesses. Inventor
Geo. E. Fuch. Edward Shaw
B. E. Seitz by A. S. Pattison
atty

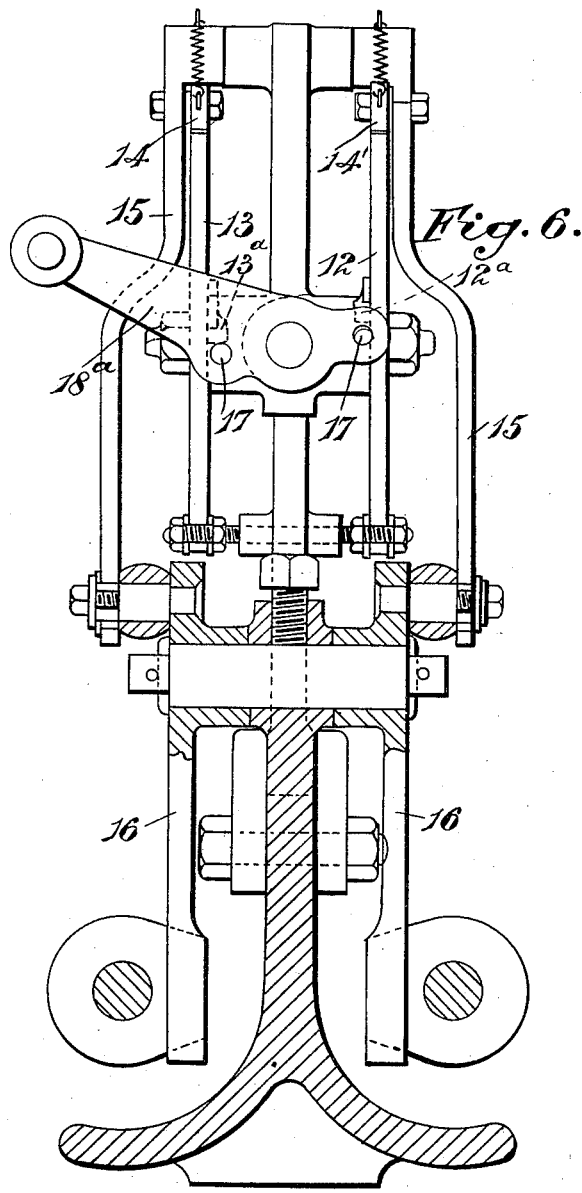

No. 688,205. Patented Dec. 3, 1901.
E. SHAW.
APPARATUS FOR PREPARING SYRUP FOR CONFECTIONERY.
(Application filed Oct. 10, 1898.)
(No Model.) 6 Sheets—Sheet 6.
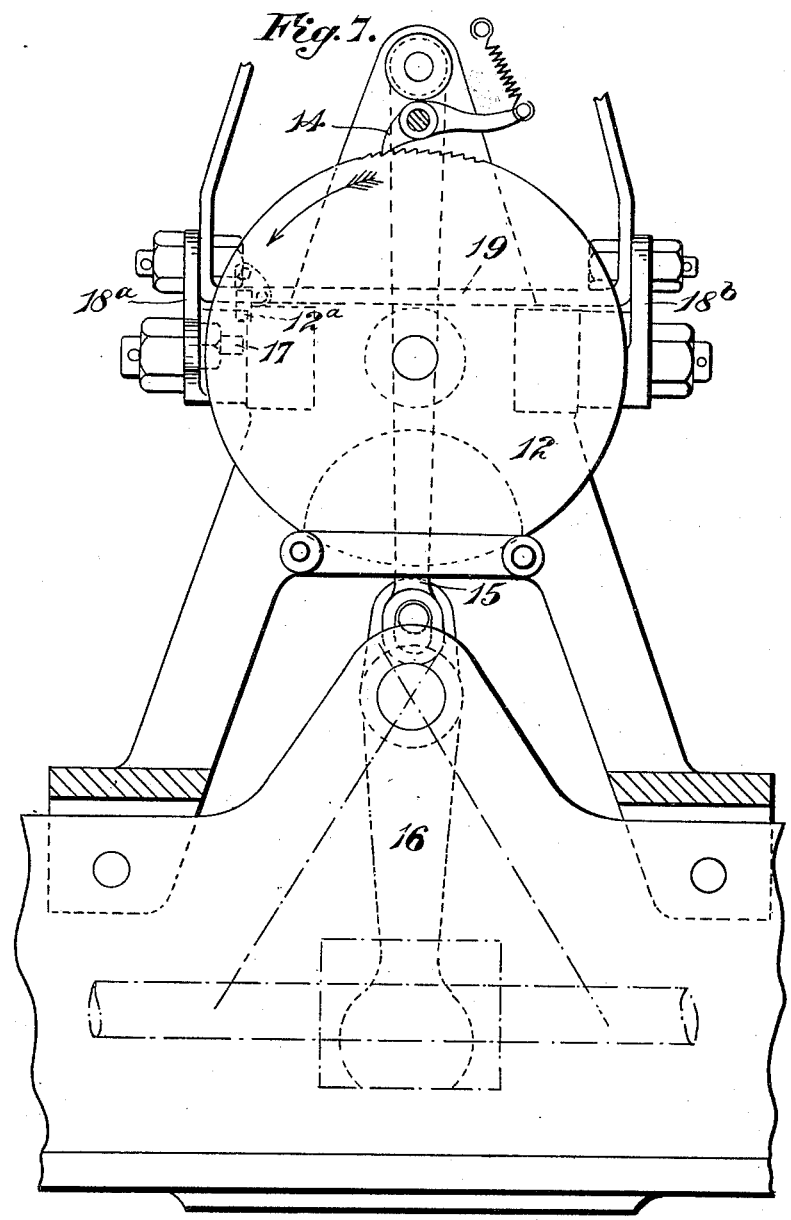

UNITED STATES PATENT OFFICE.

EDWARD SHAW, OF LONDON, ENGLAND.

APPARATUS FOR PREPARING SYRUP FOR CONFECTIONERY.

SPECIFICATION forming part of Letters Patent No. 688,205, dated December 3, 1901.

Application filed October 10, 1898. Serial No. 693,166. (No model.)

*To all whom it may concern:*

Be it known that I, EDWARD SHAW, a subject of the Queen of Great Britain and Ireland, residing at Broad street, London, England, have invented Improvements in Apparatus Suitable for Preparing Syrup for Use in the Manufacture of Sweetmeats, of which the following is a specification.

This invention has reference to improvements in apparatus of the kind in which syrup, which may consist of sugar, glucose, or a mixture thereof, is forced through an externally-heated tube, so as to convert the water in the syrup into steam or vapor. With apparatus of this kind it sometimes happens that the syrup at some part of its passage through the tube becomes overheated, and consequently discolored, owing to excessive pressure arising in the tube, and, further, the syrup sometimes becomes so far cooled as to cause the vapor or steam to condense and the water of condensation to again become mixed with the syrup previous to its discharge from the apparatus. Now objects of this invention are to avoid these disadvantages, for which purpose I provide such apparatus with means, such as a pump, for exhausting air or vapor, so arranged as to maintain the pressure in the tube at or slightly above that of the atmosphere.

One arrangement of apparatus comprises a steam-heated coil through which syrup is forced by a pump and which discharges into a separating-chamber the upper part of which is in communication with an air-pump, communication between the chamber and the pump being controlled by a suitable spring or weight-loaded valve that is so regulated as to open when the pressure in the chamber rises, say, to half a pound above that of the atmosphere and to close as soon as it falls below that pressure.

The syrup may be withdrawn from the separating-chamber in any convenient way. For instance, it may be allowed to flow by gravity through an opening in the bottom of the chamber, said opening being fitted with a regulating-valve, or said opening may be fitted with a suitably-loaded valve, through which the syrup is forced only when the pressure in the separating-chamber is sufficient to overcome the load on said valve, another valve being provided between the chamber and the pump, which is periodically closed, so as to cause the required temporary increase of pressure.

In some cases instead of the spring or weight-loaded pressure-regulating valve above referred to being placed between the separating-chamber and the air-pump it may be placed between the coil and the separating-chamber.

Preferably the pressure-regulating valve is provided with means for periodically closing it, in which case this one valve acts both to regulate the pressure and also to cause periodical increase of pressure, as desired.

Figure 4:
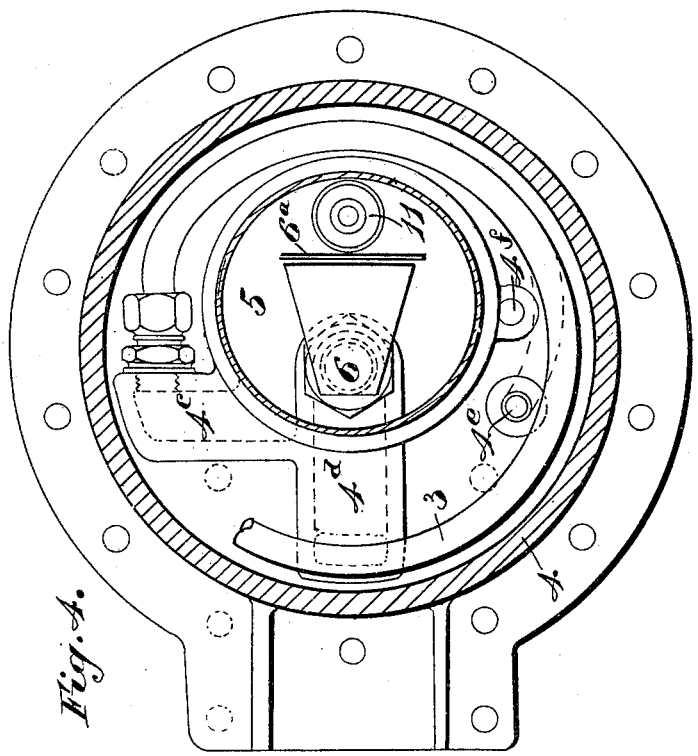
Figure 8:
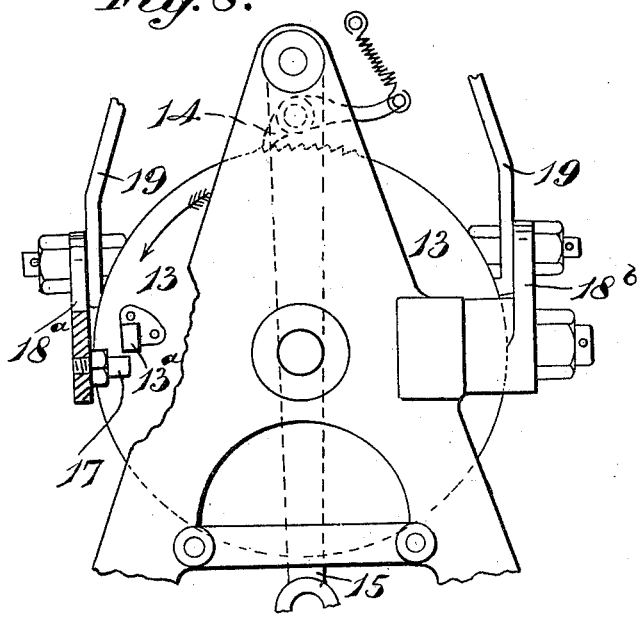
Figure 5:
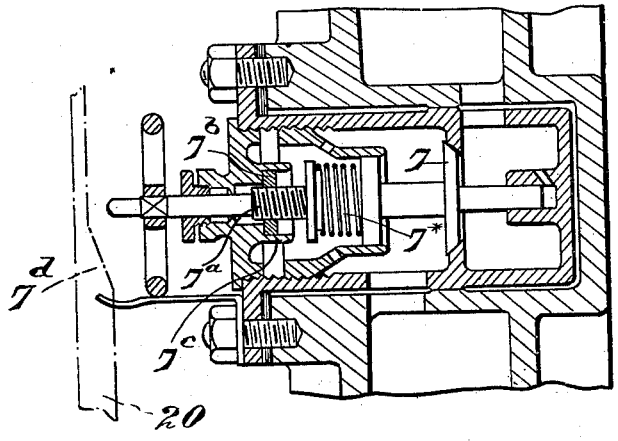

Referring to the accompanying drawings, Figures 1 and 2 are elevations at right angles to each other of a construction of apparatus according to this invention. Fig. 3 is a vertical section of the cooking-coil and collecting-chamber. Fig. 4 is a horizontal section of the same. Fig. 5 is a sectional view of one of the valves controlling the withdrawal of vapor from the collecting-chamber; and Figs. 6, 7, and 8 are respectively a sectional end elevation and two side elevations with parts removed of means for imparting motion to the said valve.

1 is a tank for containing uncooked syrup, and 2 is a pump by which the syrup is fed to the cooking-coil 3, which is contained within a dome-shaped chamber 4, charged with steam for heating the coil 3. The coil 3 discharges into the bottom of a collecting-chamber 5, that is also contained within the steam-chamber 4 and the upper portion of which is connected by a pipe 6, controlled by a valve 7, to a jet-condenser 8, which communicates with an air-pump 9. The chamber 5 has a discharge-passage 10, that is controlled by an outwardly-opening valve 11, normally kept against its seat by a spring $11^a$, or it may be by a weight or by other means. The valve 7 is held against its seat by a spring $7^\times$, the spring being so adjusted, as by a screwed spindle $7^a$, working through a nut $7^b$, that the valve will open upon the pressure in the chamber 5 rising to, say, half a pound above that of the atmosphere. This valve 7, which is shown in section in Fig. 5, is adapted to be operated intermittently, so as to close for a given period communication between the collecting-chamber 5 and the condenser and the air-pump, thus temporarily preventing the steam generated within the coil from escaping from the chamber 5 and causing an increase of pressure therein. The pressure of the steam on the syrup eventually overcomes the resistance of the valve 11 and forces the cooked syrup through the outlet 10 onto a cooling table or slab 12. To enable this to be done, the spindle $7^a$ and nut $7^b$ are adapted to slide endwise, the nut being prevented from rotating by a guide $7^c$. After the syrup has been discharged the valve 7 is again operated, so as to reëstablish communication between the chamber 5 and the condenser and air-pump, thereby causing the pressure in said chamber to be reduced below that of the atmosphere and the valve 11 to be again closed. The valve 7 may be operated periodically in any convenient way; but in the example illustrated the feed-pump 2 is provided with means (illustrated in Figs. 6, 7, and 8) for imparting motion to the valve 7. These means comprise a couple of ratchet-wheels 12 13, which are driven by pawls 14, carried by levers 15, that are rocked by tappet-levers 16 and tappets on the piston-rods of the pump. The ratchet-wheels carry driving-studs $12^a$ $13^a$, that come into contact with pins or abutments 17 $17^a$ on opposite sides of the fulcrum of one of two levers $18^a$ $18^b$, that are coupled together by a stirrup-piece 19, that is connected by a rod or link 20, which is provided with an inclined surface or cam $7^d$ so arranged that when the rod or link is operated in one direction the inclined surface bears against the end of the spindle $7^a$ and forces it endwise, so as to increase the pressure on the spring and hold the valve 7 closed, while when operated in the other direction the inclined surface is drawn away from the end of the spindle $7^a$ and the spring allowed to act with the desired predetermined pressure. The arrangement is such that the valve is opened and closed at the required times. If desired, the valve 11 may be arranged to be similarly operated at the required times instead of operating automatically.

The collecting-chamber 5 is arranged inside the steam-chamber 4, so that the steam which supplies heat for cooking the syrup may also serve to maintain the temperature of the cooked syrup and the steam or vapor contained in the chamber 5.

The chamber 4 is detachably connected by bolts to a base-plate $4^a$, so that it can be readily lifted and the coil 3 and collecting-chamber 5 exposed for inspection or repair. The base-plate $4^a$ has cast on its upper side a circular rim $4^b$, into which the copper cylinder forming the chamber 5 is screwed. It is also formed with a passage $4^c$, leading from the coil 3 to the chamber 5, and with a passage $4^d$, by which the pipe 6, whose upper end opens into the upper part of the chamber 5 and is provided with a baffle-plate $6^a$ to prevent the entry of bubbles of syrup, is placed in communication with the condenser.

$4^e$ and $4^f$ are passages or apertures through the base-plate $4^a$, through which syrup and steam, respectively, are supplied to the coil 3 and to the chamber 4. The outlet 10 is at the bottom of a depression or well formed in the base-plate $4^a$ and in which the syrup collects. The seat of the valve 11 is formed with an inwardly-extending portion that serves to support the valve-spindle and its spring $11^a$, as shown, the arrangement being such that the seat and valve can be screwed into and out of the base-plate. The condenser is preferably formed in the column supporting the cooking-chamber. With such an arrangement not only is excessive pressure in the cooking portion of the apparatus avoided, but condensation of the steam that is separated from the syrup in the separating-chamber is prevented by the heated walls of said chamber and the inconvenient discharge of steam within the factory or the use of long exhaust-pipes is obviated. Moreover, the water is removed from the syrup at a temperature which is lower than is possible when cooked in apparatus of the kind comprising an open-ended externally-heated tube or coil, but at a higher temperature than is the case when the syrup is cooked in a vacuum pan or apparatus, the result being that the goods produced are not only of excellent color, but will stand high temperatures without deterioration.

My present invention pertains to means for maintaining a constant predetermined pressure in the tube and separating-chamber and which is here described as being used in connection with an apparatus with a pressure above the pressure of the atmosphere. However, I do not wish to be understood to limit my invention to this particular application, for the regulating device can be advantageously used in an apparatus in which the pressure is below that of the atmosphere. In either event, however, the pressure of the liquid-discharging valve will be greater than that of the regulating-valve, whereby the regulating-valve is normally open, (when the apparatus is in operation,) and the regulating-valve is so constructed that its pressure can be made to periodically exceed the pressure of the liquid-discharging valve to cause the delivery of the liquid from the separating-chamber.

What I claim is—

1. An apparatus for preparing syrup for confectionery comprising an externally-heated cooking-tube, a closed separating-chamber separate from but in communication with said cooking-tube, said chamber having a pressure-escape passage, a pressure-escape valve controlling said passage and thereby controlling the pressure within said separating-chamber, said chamber having also a liquid-escape passage, and a pressure-regulated valve controlling said liquid-escape passage.

2. A syrup-cooking apparatus comprising an externally-heated cooking-tube through which the syrup is passed, a separating-chamber separate from but in communication with the said cooking-tube, said chamber having a pressure-regulated liquid-escape, and having also a pressure vapor-escape, and a valve for said vapor-escape adapted to be opened by the pressure within said separating-chamber when the pressure liquid-escape remains closed.

3. An apparatus for preparing syrup for confectionery, comprising a separating-chamber, an intermittently-controlled pressure-closed vapor-escape valve, and a pressure-regulated liquid-escape for said separating-chamber, substantially as described.

4. An apparatus for preparing syrup for confectionery comprising a separating-chamber, said separating-chamber having a vapor-escape passage-way and a liquid-escape passage-way, a pressure-actuated closed valve for said vapor passage-way, a pressure-closed valve for said liquid passage-way, and an operating member for opening the pressure-closed vapor-escape valve against the pressure thereof, substantially as described.

5. An apparatus for preparing syrup for confectionery comprising a separating-chamber having a liquid-escape and a vapor-escape, a pressure-closed valve for each of said escapes, the pressure of the liquid-escape valve being of less degree than the pressure of the vapor-escape valve, and intermittently-actuated means for opening the vapor-escape valve, substantially as described.

6. Apparatus for preparing syrup for use in the manufacture of sweetmeats, comprising a coiled tube, a collecting-chamber communicating therewith and formed with a syrup-discharging aperture, both said tube and chamber being contained within a steam-charged dome or cover, a syrup-feeding pump, an air or vapor pump, and a valve controlling communication between said chamber and the air or vapor pump said valve opening only when the pressure in the chamber exceeds atmospheric pressure and being connected to mechanism driven by the feed-pump whereby it is periodically closed, as set forth.

7. Apparatus for preparing syrup for use in the manufacture of sweetmeats, comprising a tank 1, feed-pump 2, coil 3, steam-chamber 4, collecting-chamber 5 with syrup-discharging aperture 10, vapor-pipe 6 fitted with baffle 6$^a$ and leading to a condenser 8, an air-pump 9 and a valve 7, as set forth.

8. Apparatus for preparing syrup for use in the manufacture of sweetmeats, comprising a tank 1, a feed-pump 2, coil 3, a collecting-chamber 5 with valved syrup-discharging aperture 10, a steam-chamber 4 inclosing both coil 4 and chamber 5, a vapor-pipe 6 fitted with baffle 6$^a$ and leading to a jet-condenser 8 arranged in the stand of the apparatus, an air-pump 9, and a valve 7 that controls communication between the chamber 5 and the condenser 8, and opens only when the pressure in the chamber 5 exceeds that of the atmosphere and is also operated by the feed-pump 2 so as to periodically close said communication, as set forth.

9. An apparatus for preparing syrup for confectionery comprising a separating-chamber having a vapor-pressure-escape passage, an intermittently-controlled valve for said escape, said chamber having also a pressure-regulated liquid-escape, the parts coöperating substantially as described.

10. Apparatus for preparing syrup for use in the manufacture of sweetmeats, comprising a syrup-feeding pump, an externally-heated tube, a collecting-chamber into which said tube discharges and which has a syrup-discharging aperture, a vapor or air pump, a valve controlling communication between said collecting-chamber and vapor or air pump, and which opens when the pressure in the chamber exceeds that of the atmosphere, a rod connecting the other of said valves to a lever provided on opposite sides of its fulcrum with a pin or abutment, a couple of wheels driven by said feed-pump and each carrying a stud, the said pins or abutments being arranged respectively in the paths of the said studs, which come successively in contact with their respective studs and intermittently rock the lever and open and close the latter valve, as and for the purpose set forth.

Signed at 2 Popes Head alley, Cornhill, London, this 21st day of September, 1898.

EDWARD SHAW.

Witnesses:
PERCY E. MATTOCKS,
WM. O. BROWN.